US 10,111,412 B1

(12) United States Patent
Hebert

(10) Patent No.: US 10,111,412 B1
(45) Date of Patent: Oct. 30, 2018

(54) FISH CULLING CLIP

(71) Applicant: Roland G Hebert, Queen Creek, AZ (US)

(72) Inventor: Roland G Hebert, Queen Creek, AZ (US)

( * ) Notice: Subject to any disclaimer, the term of this patent is extended or adjusted under 35 U.S.C. 154(b) by 0 days.

(21) Appl. No.: 15/791,588

(22) Filed: Oct. 24, 2017

(51) Int. Cl.
| | | |
|---|---|---|
| *A01K 65/00* | (2006.01) | |
| *A01K 97/00* | (2006.01) | |
| *A01K 97/18* | (2006.01) | |
| *A01K 97/20* | (2006.01) | |
| *A01K 61/95* | (2017.01) | |
| *A01K 97/14* | (2006.01) | |
| *A01K 99/00* | (2006.01) | |
| *B66C 1/44* | (2006.01) | |
| *B66C 3/06* | (2006.01) | |
| *A01K 11/00* | (2006.01) | |

(52) U.S. Cl.
CPC .............. *A01K 61/95* (2017.01); *A01K 65/00* (2013.01); *A01K 97/00* (2013.01); *A01K 97/14* (2013.01); *A01K 97/20* (2013.01); *A01K 99/00* (2013.01); *B66C 1/442* (2013.01); *B66C 3/06* (2013.01); *A01K 11/00* (2013.01)

(58) Field of Classification Search
CPC ........ A01K 97/20; A01K 97/00; A01K 97/18; A01K 65/00; A01K 99/00; B66C 1/442; B66C 3/06; G01G 19/56; G01G 19/60; G01G 19/14
USPC ....... 43/4, 55, 54.1, 53.5; 224/103; 294/109, 294/110.1, 115, 106; 177/131, 148, 245
See application file for complete search history.

(56) References Cited

U.S. PATENT DOCUMENTS

| | | | | |
|---|---|---|---|---|
| 54,007 A | * | 4/1866 | O'Neil .................... | G01G 19/60 177/148 |
| 172,954 A | * | 2/1876 | Beeman .................... | B25B 9/00 294/115 |
| 327,575 A | * | 10/1885 | Mitchell .................. | E05B 75/00 70/17 |
| 406,546 A | * | 7/1889 | Taber ..................... | A01K 97/14 294/19.3 |
| 697,894 A | * | 4/1902 | Shiley .................... | G01G 19/60 177/148 |
| 1,129,664 A | * | 2/1915 | Gilchrist ................... | B66C 3/04 294/110.1 |

(Continued)

FOREIGN PATENT DOCUMENTS

FR 2720226 A1 * 12/1995 ............. A01K 97/14
JP 6018912 B2 * 11/2016

*Primary Examiner* — Darren W Ark
(74) *Attorney, Agent, or Firm* — Invention To Patent Services; Alex Hobson

(57) ABSTRACT

A self-tightening culling clip used to secure a marker to a fish for quick identification of the fish in a livewell, for example. The self-tightening culling clip has handles coupled together about a handle pivot and a marker attached to a lift-pivot. A spring forces the jaw end of the handles together and a user may squeeze the handle end of the handles to open the jaws for attaching to a fish. When the marker is lifted, the handles pivot about the handle-pivot to apply force to close the jaws, thereby creating a self-tightening culling clip. A pair of links extend from the lift pivot to the handles and these links for the handle end of the handles outward when the marker is lifted. The marker may have a distinctive identifier color and/or character.

20 Claims, 2 Drawing Sheets

(56) References Cited

U.S. PATENT DOCUMENTS

| | | | | |
|---|---|---|---|---|
| 1,172,915 | A * | 2/1916 | Stevens | F16B 45/06 188/9 |
| 1,257,260 | A * | 2/1918 | Long | E21B 31/18 294/115 |
| 1,688,404 | A * | 10/1928 | Stark | B01L 9/50 294/115 |
| 1,696,817 | A * | 12/1928 | St John | A63B 47/02 294/110.1 |
| 1,879,161 | A * | 9/1932 | Frambach | A01K 97/18 294/93 |
| 1,941,064 | A * | 12/1933 | Wendt | A47G 21/10 119/806 |
| 1,952,990 | A * | 3/1934 | Kirsch | A01K 97/18 43/53.5 |
| 2,176,921 | A * | 10/1939 | Neff | B66C 3/06 175/212 |
| 2,193,073 | A * | 3/1940 | Norton | A01K 97/14 294/100 |
| 2,506,839 | A * | 5/1950 | Mead | A01K 65/00 224/103 |
| 2,588,733 | A * | 3/1952 | Knox | B65G 47/61 212/77 |
| 2,637,088 | A * | 5/1953 | Foster | A01K 27/005 24/598.5 |
| 2,643,151 | A * | 6/1953 | Zupancic | A01K 97/00 24/498 |
| 2,653,048 | A * | 9/1953 | Novak | A22C 25/06 24/557 |
| 2,712,469 | A * | 7/1955 | Burnor | H01M 2/1011 294/106 |
| 2,745,694 | A * | 5/1956 | Wagemann | A01D 87/003 294/109 |
| 2,951,725 | A * | 9/1960 | St Jean | B66C 1/32 294/106 |
| 3,041,102 | A * | 6/1962 | Day | A01M 23/265 294/110.1 |
| 3,051,521 | A * | 8/1962 | Skowron | B66C 1/422 294/110.1 |
| 3,158,145 | A * | 11/1964 | Handy | F41B 5/143 124/44.5 |
| 3,288,513 | A * | 11/1966 | Behrick | A01K 97/14 294/19.3 |
| 3,514,892 | A * | 6/1970 | Wormsbecker | A01K 97/18 43/53.5 |
| 3,521,396 | A * | 7/1970 | Allen | A01K 97/18 43/53.5 |
| 3,697,118 | A * | 10/1972 | Johnstone | B66C 1/422 294/110.1 |
| 4,013,295 | A * | 3/1977 | Baughman | A63B 47/02 294/19.2 |
| 4,239,274 | A | 12/1980 | Linberg et al. | |
| 4,441,746 | A * | 4/1984 | Corboy, Jr. | B25B 9/00 294/115 |
| 4,740,024 | A | 4/1988 | Hultquist | |
| 5,119,585 | A * | 6/1992 | Camp | A01K 97/00 177/131 |
| 5,666,758 | A * | 9/1997 | Vaillier | A01K 97/24 294/110.1 |
| 5,979,752 | A * | 11/1999 | Holloway | G01G 23/40 116/325 |
| 5,987,808 | A * | 11/1999 | Coles | A01K 97/00 177/245 |
| 6,012,752 | A * | 1/2000 | Douglas | B66C 1/422 294/110.1 |
| 6,044,582 | A * | 4/2000 | Johnson | A01K 61/90 223/103 |
| 6,560,913 | B1 * | 5/2003 | Liao | A01K 97/14 177/148 |
| 6,696,650 | B2 * | 2/2004 | Muller | G01G 19/60 177/131 |
| 6,766,609 | B1 * | 7/2004 | Aboczky | A01K 97/14 177/131 |
| 6,769,212 | B2 * | 8/2004 | Grayson | A01K 97/14 43/4 |
| 6,862,834 | B2 * | 3/2005 | Basch | A01K 61/90 43/4 |
| 6,943,304 | B1 * | 9/2005 | Brady | G01G 19/60 177/148 |
| 6,989,495 | B2 * | 1/2006 | Yang | A01K 97/14 177/131 |
| 7,055,281 | B1 * | 6/2006 | Faneuf | A01K 97/14 43/43.1 |
| 7,076,910 | B1 * | 7/2006 | Xifra | A01K 97/00 177/148 |
| 7,478,497 | B2 * | 1/2009 | Otsuka | A01K 97/14 177/148 |
| 7,874,096 | B2 * | 1/2011 | Callaway | A01K 97/00 43/1 |
| 7,937,882 | B2 * | 5/2011 | Mullins | A01K 97/00 206/315.11 |
| 8,186,097 | B2 * | 5/2012 | Crawford | A01K 61/90 224/103 |
| 8,341,808 | B2 | 1/2013 | Vermillion et al. | |
| 8,806,800 | B2 * | 8/2014 | Hupp | A01K 97/14 43/4 |
| 9,781,912 | B2 * | 10/2017 | Pope | A01K 97/00 |
| 2012/0204474 | A1 * | 8/2012 | Mihara | A01K 97/14 43/55 |
| 2012/0260556 | A1 * | 10/2012 | Hupp | A01K 97/00 43/4 |

* cited by examiner

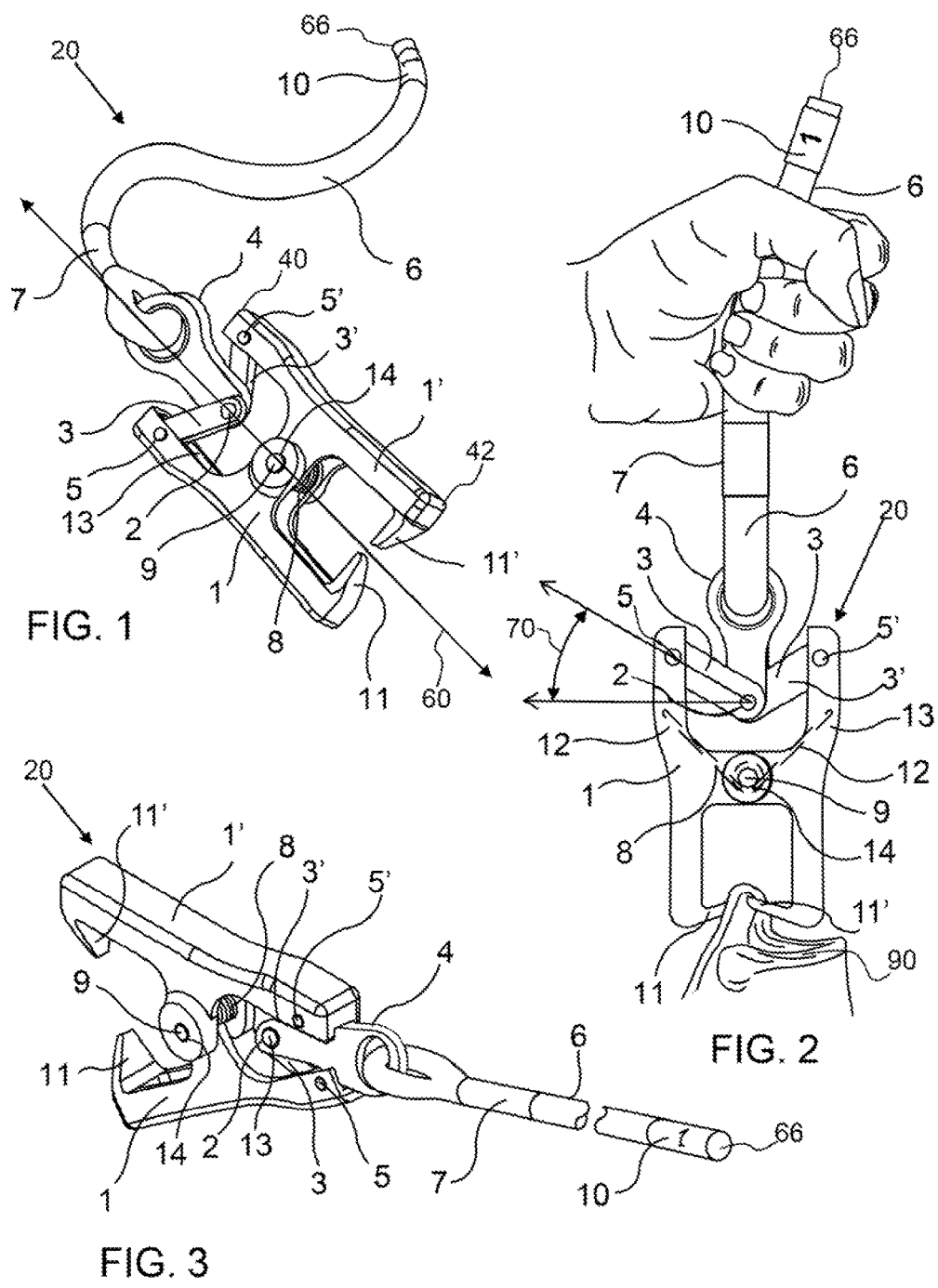

FISH CULLING CLIP

BACKGROUND OF THE INVENTION

Field of the Invention

This application is directed to a self-tightening culling clip for fish culling that does not require piercing the mouth of the fish.

Background

Tournament fisherman compete to catch the heaviest legal quantity of five fish over a given period of time, for example. The fisherman therefore has to keep track of the weight of the fish as they are caught and throw out smaller fish for heavier. The fish are placed in a livewell and identification of the fish, such as the lightest weight fish for removal, is typically accomplished with a culling tag. A culling tag is attached to the fish and has an identifier, such as a colored float or rope. The fisherman keeps track of the individual fish weight that corresponds with the colored identifier. When a fisherman catches a fish that weighs 3 lbs, for example, they may look for the lightest weight fish in the livewell, such as a fish weighing 2.25 lbs, and remove it from the livewell in exchange for the heavier 3 lb fish. The 2.25 lb fish may have a yellow identifier float which the fisherman can grab to pull the fish from the livewell. The fisherman would then attach the culling clip to the heavier, 3 lb fish, and place the fish in the livewell. Many culling clips pierce the mouth of the fish which is not desired as this can cause infection and injury to the fish. Piercing culling clips are being banned in some tournaments and bodies of water. Other non-piercing culling clips have springs or clamps but fish sometimes slip off of the clip especially when the fish is pulled out of the livewell and the force on the clip is increased due to the weight of the fish suspended from the clip and from the fish thrashing when removed. There is a need for a culling clip that securely fastens to the fish and that does not require piercing the mouth of the fish. Some of these non-piercing clips are cumbersome requiring manipulation of the clip with two hands to secure the clip to the fish.

SUMMARY OF THE INVENTION

The invention is directed to a self-tightening, non-invasive, culling clip used to secure a marker to a fish for quick identification of the fish in a livewell, for example. The self-tightening culling clip has handles coupled together about a handle pivot and a marker attached to a lift-pivot. A spring forces the jaw end of the handles together and a user may squeeze the handle end of the handles to open the jaws for attaching to a fish. When the marker is lifted, the handles pivot about the handle-pivot to apply force to close the jaws, thereby creating a self-tightening culling clip. A pair of links extend from the lift pivot to the handles and these links force the handle end of the handles outward when the marker is lifted. The marker may have a distinctive identifier color and/or character.

An exemplary self-tightening culling clip comprises a pair of handles having a length from a jaw end to a handle end that may be about 2 inches or more, about 3 inches or more, about 6 inches or more, no more than about 6 inches and any range between and including the length values provided. The handle pivot may be centrally located between the two handles and may be configured centrally along the length of the handles, such within about 30% of the center point along the length, or within about 20% of the center point along the length. A spring, such as a torsional spring may be configured to force the jaw end of the handles toward each other or closed. The handles have a handle end that can be manually manipulated to overcome the spring force and open the jaws for attachment or release of a fish therefrom. A pair of jaws may extend inward from the handles to provide better retention of a fish thereon.

An exemplary self-tightening culling clip comprises a pair of links that are coupled to the lift-pivot and force the jaw ends of the handles together when the marker is lifted to move the lift-pivot toward the handle end of the self-tightening culling clip. The links may be coupled to the handles by a link-pivot and extend from the link-pivot toward the jaw end of the exemplary self-tightening culling clip, or handles, at an offset angle. This offset angle may be about 10 degrees or more, 30 degrees or more, about 45 degrees or more, about 60 degrees or more no more than about 90 degrees, and any range between and including the offset angles provided.

The marker may be a flexible elongated member, such as a rope or cord having a length that is a least about three times a width or diameter or in some cases a length that is at least 10 times greater than a width or diameter. A marker may be made out of a material that is hydrophobic and does not absorb water, such as a synthetic rope, or rope comprising polymeric fibers or yarns including but not limited to polypropylene, nylon, polyester and the like. Likewise, the maker may be from or comprise foam or other materials that floats on water. An exemplary marker is preferably made of a material that will float to the top of the water in the livewell. A maker has an attached end, coupled to the clip and a free end, or end that is not connected and will float and move as the fish swim in the livewell. An exemplary marker may have a distinctive identifier, such as a color, or character including, but not limited to, a number, a letter and/or a symbol. A distinctive color may be preferred as it may be easiest to identify when the marker is moving about in a livewell.

The handles may have a recess between a first face and a second face and the pivots may be configured in the space between the faces. A torsional spring may be wound about the handle-pivot and a first and second extension from the torsional spring may extend out from the handle-pivot and into the recess of the opposing handles. A handle-pivot may comprise a pin, such as a pivot shaft, and the handles may have apertures for receiving the pin to form the handle-pivot.

A marker coupler may be configured between the flexible maker and the lift-pivot. An exemplary marker coupler may have an aperture for receiving the marker and may have an aperture for receiving a pin to form the lift-pivot. An exemplary marker coupler may also comprise a pin that extends through the lift-pivot and may act as the pin for the lift-pivot wherein the links comprise an aperture that extends around the marker coupler. A marker coupler may be a ring of wire forming an opening for receiving the marker and extending through the lift-pivot. A lift-pivot may comprise a bushing or cylinder that the marker coupler extends through.

Likewise, the lift-pivot end of the links may have an aperture for receiving a pin to form the lift-pivot or may form the pin of the lift pivot. The link-pivot ends of the links may also have an aperture for receiving a pin that extends through said aperture and the handle to form the link-pivot. The links may extend into a recess of the handle to form the link-pivot.

The clip portion of the self-tightening culling clip may also be made out of a material that will float, such as a plastic or polymeric material. The clip portion may be made from a rigid plastic that can withstand the forces applied to retain a fish when pulled from the live well and secured by the jaws of the clip.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows a perspective view of an exemplary self-tightening culling clip.

FIG. 2 shows a side view of an exemplary self-tightening culling clip having a fish secured by the jaws and a person holding the marker.

FIG. 3 shows a perspective view of an exemplary self-tightening culling clip.

Figures 4, 5, 6:
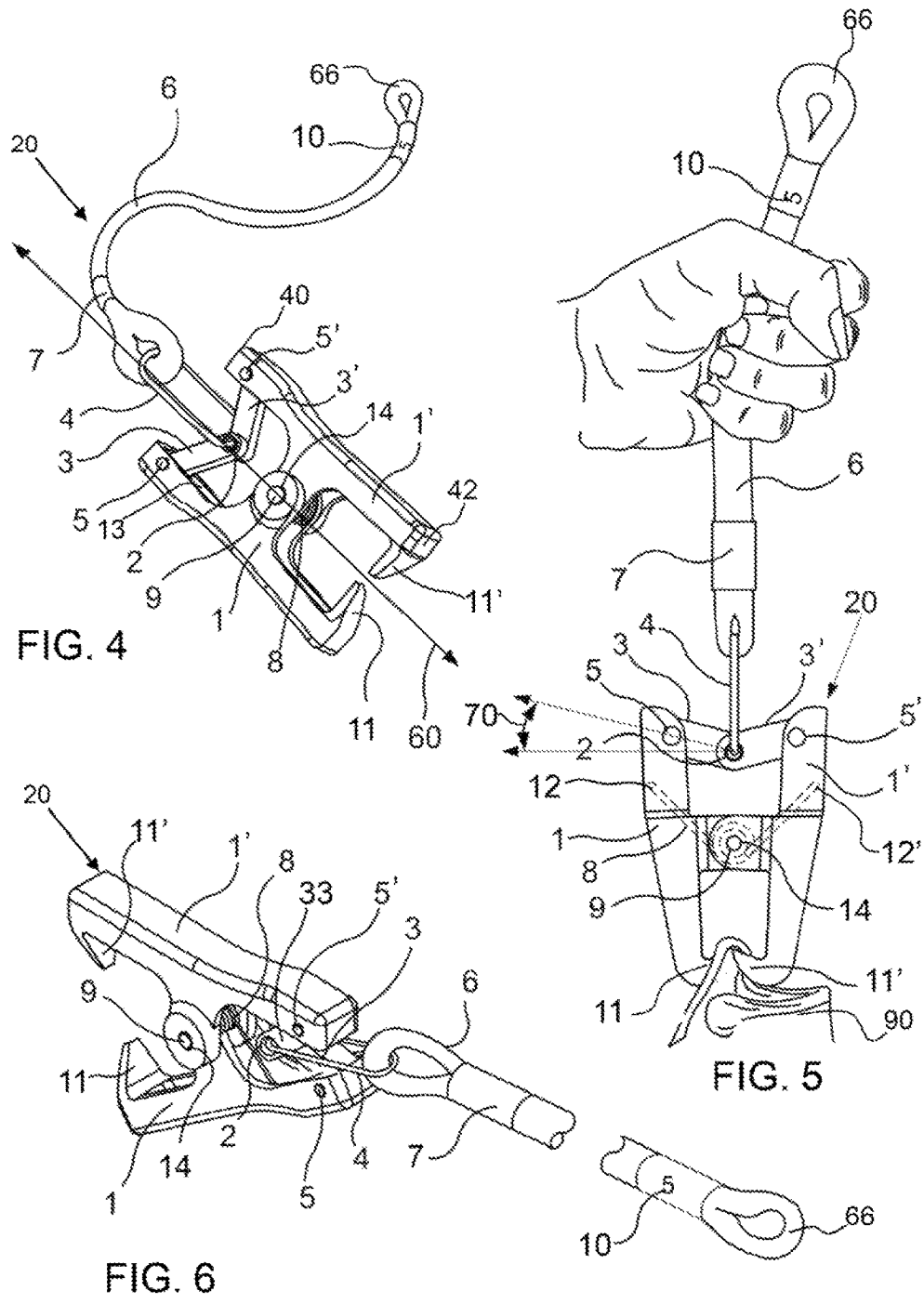
FIG. 4 shows a perspective view of an exemplary self-tightening culling clip.
FIG. 5 shows a side view of an exemplary self-tightening culling clip having a fish secured by the jaws and a person holding the marker.
FIG. 6 shows a perspective view of an exemplary self-tightening culling clip.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 6, an exemplary self-tightening culling clip 20 comprises a pair of handles 1, 1' that are coupled about a handle-pivot 14. A spring 8, such as a torsional spring, is configured about the handle pivot and forces the jaws 11, 11' toward each other to retain the clip on a fish 90, as shown in FIG. 2. The handles have a length from a jaw end 42 to a handle end 40. The handle-pivot 14 is configured between the jaw end and the handle end, and may be centrally located along the length of the handles, as shown. The handle pivot may be located an offset distance from the jaw end and this offset distance may be within about 30% of a center point along the length, or within about 20% of a center point along the length, thereby being centrally located. The spring extensions 12, 12' of the spring 8 extend from the handle-pivot and into a recess 13 of the handles 1, 1'. A user may squeeze the handles together on the handle end to open the jaws 11, 11'. The jaws extend inward from the handles toward the center line 60 to allow room to place the handles around a mouth of a fish 90. The handle-pivot 14 may comprise a pin 9 and the handles may have apertures for receiving the pin to produce the handle-pivot.

A marker 6, such as a flexible cord or rope, is coupled to the lift-pivot 2. A marker may be a cord or rope that floats in water and may have a synch 7 to secure the maker to the lift-pivot or to a marker coupling 4. The marker 6 may have an identifier 10 such as a color, or a character including, but not limited to, a number and/or letter or symbol. As shown in FIGS. 1 to 3, a numerical identifier, "1", is an identifier. Again, a portion of the length of the marker may be a specific color or design to allow the angler to quickly identify the maker and fish that needs to be pulled from the livewell. The entire marker may be a color from the connected end to the free end 66. A fisherman may use a plurality of self-tightening culling clips and each may have a distinctive marker identifier color, such as yellow, red, orange, blue, green and the like. They may also have a distinctive character identifier, such as number 1, number 2, number 3, and the like. The free end of the marker as shown in FIGS. 4 to 6 comprises a loop or aperture, which may be used to hang the self-tightening culling clip to a scale to weigh the fish.

Links 3, 3' are coupled to the handles by link-pivots 5, 5' and extend inward toward the length axis 60 of the self-tightening culling clip. The links extend at an offset angle 70 of at least 10 degree from the link-pivot toward the jaw end of the handles, as shown in FIGS. 2 and 5. The lift-pivot 2 moves toward the handle end 40 of the handles when the marker 6 is pulled and this forces the links outward and the handle ends away from each other. This causes the handles to pivot about the handle-pivot to close the jaws toward each other. The links are coupled to the handles by link-pivots 5, 5' and extend from the link-pivot end to the lift-pivot end. The lift-pivot may comprise a pin and the links may have apertures for receiving the pin to form the lift-pivot. The link-pivots may also comprise a pin and the links may comprise apertures for receiving the pin to form the link-pivot. The handles may have a recess 13 and the links 3 may extend into the recess where the pin extends through the link to form the link-pivot 5.

A marker coupling 4 may be configured between the flexible marker and the lift-pivot, as shown. As shown in FIG. 1 to 3, the marker coupling has an aperture for receiving the marker, and an aperture for receiving a pin of the lift-pivot. As shown in FIGS. 4 to 6, an exemplary self-tightening culling clip 20 is similar to the self-tightening culling clip shown in FIGS. 1 to 3, except that the marker coupler forms the pin of the lift-pivot 2, wherein the links 3, 3' have apertures at the link-pivot end for receiving the marker coupler. A lift-pivot may comprise a bushing 33, or cylinder for receiving the marker coupler 4.

The handles may have a recess 13 along the inside surface for forming the handle-pivot and the link-pivots. The spring 8 and/or the spring extensions 12, 12' may be configured in this recessed area or between the opposing faces of the handles.

As shown in FIGS. 2 and 5, a fish 90 is being retained by the jaws 11, 11'. A person is holding the marker 6 and the weight of the fish causes the jaws to self-tighten. The lift-pivot 2 is being pulled up, and this causes the links 3, 3' to push outward on the handles 1,1' at the link-pivots 5, 5' respectively. Forcing the handles outward at the link-pivots causes the handles to pivot about the handle-pivot 14 to move the jaws 11, 11' closed or toward each other to secure the fish. The heavier the fish, the more force the jaws will exert on the mouth of the fish to secure the fish.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A self-tightening culling clip comprising:
   a) a pair of handles comprising:
      i) a jaw end;
      ii) a handle end;
      iii) a length from the jaw end to the handle end;
   wherein the pair of handles are coupled together at a handle-pivot;
   b) a jaw extending from each handle of the pair of handles;
   c) a spring coupled to the handles that forces the jaw end of the handles together;
   d) a pair of links, each link of the air of links pivotably connected to and extending inward from a respective handle of the pair of handles from a position proximal to the handle end toward the jaw end where the pair of links are coupled together by a lift-pivot;
   e) a marker coupled to the lift-pivot;
   wherein when the marker is pulled away from the handles from the handle end, the lift-pivot is moved toward the handle end to force the handle end of the handles away from each other and the jaw ends of the handles, and the jaws, toward each other, wherein the pair of handles pivot about the handle-pivot.

2. The self-tightening culling clip of claim 1, wherein the spring is a torsional spring.

3. The self-tightening culling dip of claim 2, wherein the torsional spring is configured around the handle-pivot.

4. The self-tightening culling clip of claim 1, wherein the marker is a flexible elongated member that floats on water.

5. The self-tightening culling dip of claim 4, wherein the marker comprises an identifier.

6. The self-tightening culling clip of claim 5, wherein the identifier is a character.

7. The self-tightening culling clip of claim 5, wherein the identifier is a color.

8. The self-tightening culling dip of claim 1, further comprising a marker coupling that is configured between the marker and the lift-pivot.

9. The self-tightening culling clip of claim 8, wherein a portion of the marker coupling extends through apertures in each of the pair of links to form the lift-pivot.

10. The self-tightening culling clip of claim 1, wherein the marker coupling comprises an aperture and wherein a pin of the lift-pivot extends through said aperture in the marker coupling.

11. The self-tightening culling clip of claim 1, wherein the lift-pivot comprises a pin and wherein each link of the pair of links comprises an aperture for receiving said pin to form said lift-pivot.

12. The self-tightening culling dip of claim 1, wherein each link of the pair of links extend from a link-pivot coupled to a respective handle of the pair of handles to the lift-pivot.

13. The self-tightening culling dip of claim 12, wherein the link-pivot is configured more proximal to the handle end of the handles than the lift-pivot and wherein the pair of links extend from the link-pivots toward the lift-pivot at an offset angle.

14. The self-tightening culling dip of claim 13, wherein the offset angle is at least 10 degrees.

15. The self-tightening culling dip of claim 13, wherein the link-pivot comprises a pin and wherein each link of the pair of links comprises an aperture for receiving said pin to form said link-pivot.

16. The self-tightening culling dip of claim 1, wherein the length of the handles is between 2 inches and 6 inches.

17. The self-tightening culling clip of claim 1, wherein the handle-pivot comprises a pin and wherein each handle of the pair of handles comprises an aperture for receiving said pin to form said handle-pivot.

18. A self-tightening culling clip comprising:
   a) a pair of handles comprising:
      i) a jaw end;
      ii) a handle end;
      iii) a length from the jaw end to the handle end;
   wherein the pair of handles are coupled together at a handle-pivot;
   b) a jaw extending from each handle of the pair of handles;
   c) a torsional spring coupled to the handles about the handle-pivot that forces the jaw end of the handles together;
   d) a pair of links, each link of the pair of links pivotably connected to and extending inward from a respective handle of the pair of handles from a position proximal to the handle end toward the jaw end and wherein the pair of links are coupled together by a lift-pivot;
   wherein each link of the pair of links extend from a link-pivot coupled to a respective handle of the pair of handles to the lift-pivot;
   wherein the link-pivots are configured more proximal to the handle end of the handles than the lift-pivot and wherein the pair of links extend from the link-pivots toward the lift-pivot at an offset angle when the jaw ends of the pair of handles is open;
   e) a marker coupled to the lift-pivot having an identifier;
   wherein the marker floats on water and is a flexible elongated member having a free extended end.

19. The self-tightening culling clip of claim 18, wherein the identifier is a character.

20. The self-tightening culling clip of claim 18, wherein the identifier is a color.

* * * * *